2,430,534

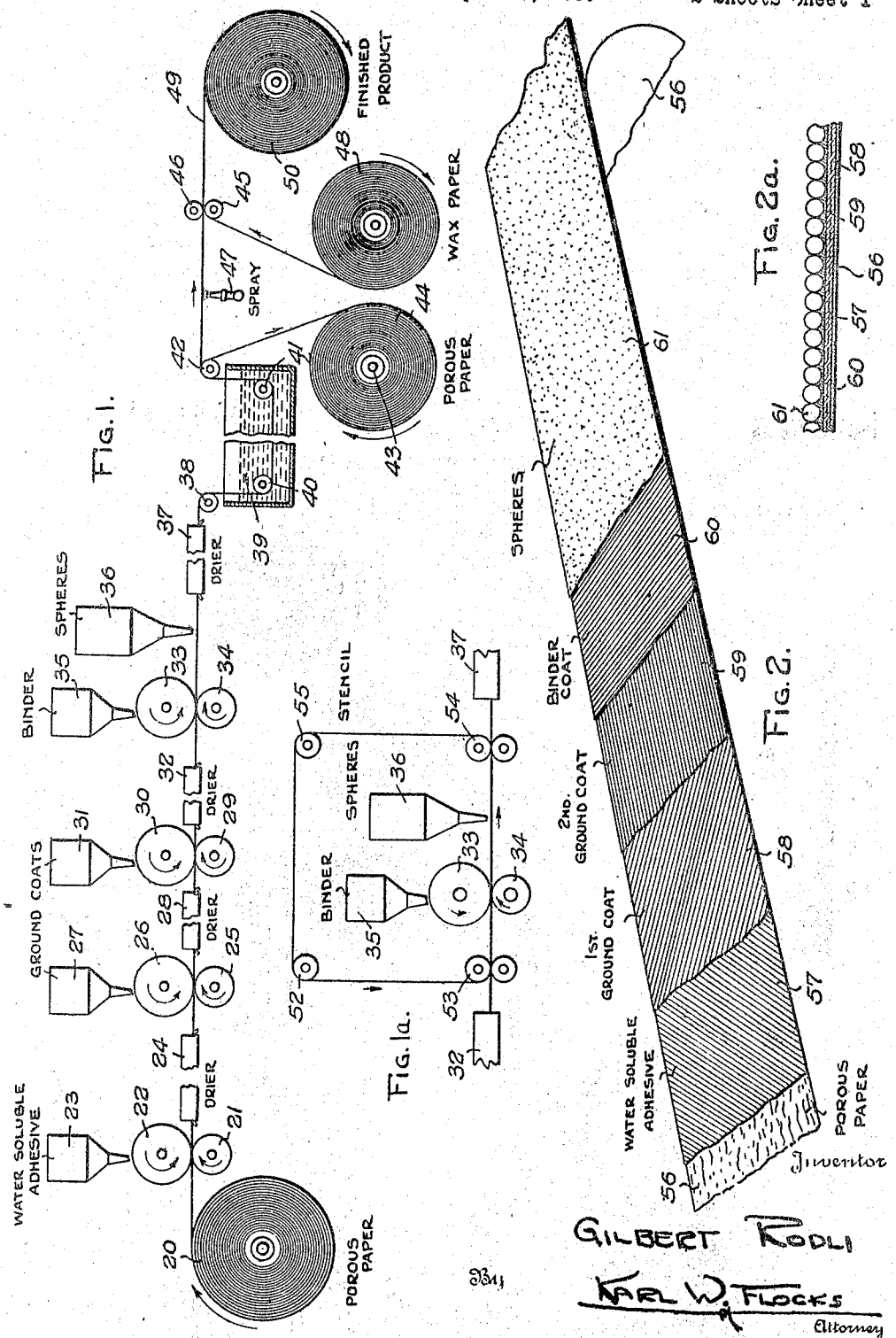
Nov. 11, 1947. G. RODLI 2,430,534
MARKER AND PROCESS OF MAKING IT
Filed Sept. 27, 1939 2 Sheets-Sheet 1
Inventor
GILBERT RODLI
KARL W. FLOCKS
Attorney Nov. 11, 1947.  G. RODLI  2,430,534
MARKER AND PROCESS OF MAKING IT
Filed Sept. 27, 1939  2 Sheets-Sheet 2
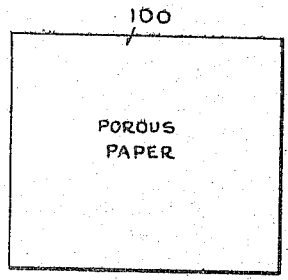
Fig. 3.
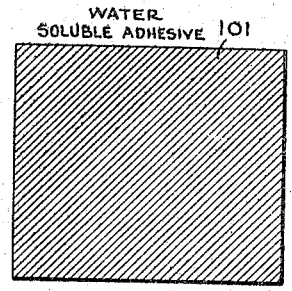
Fig. 4.
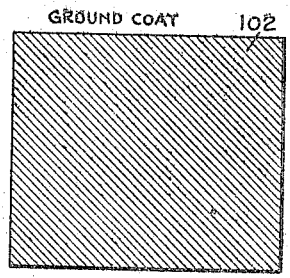
Fig. 5.
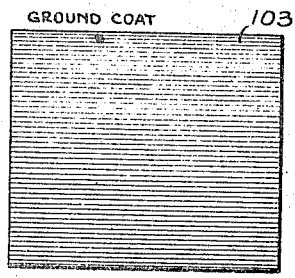
Fig. 6.
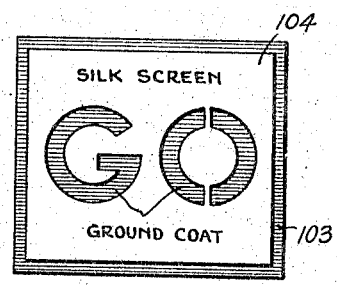
Fig. 7.
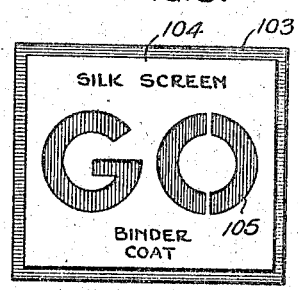
Fig. 8.
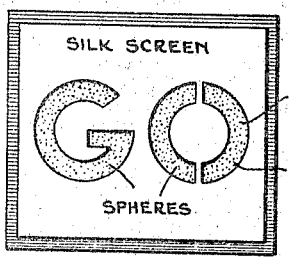
Fig. 9.
Fig. 10.
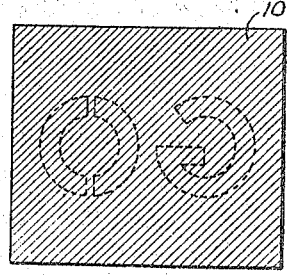
Fig. 11.
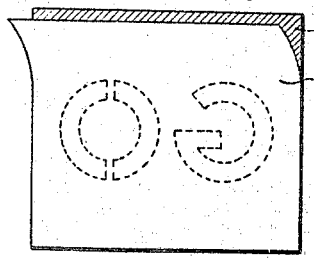
Fig. 12.
Fig. 7a.
Inventor
GILBERT RODLI
By KARL W. FLOCKS
Attorney Patented Nov. 11, 1947

UNITED STATES PATENT OFFICE 2,430,534

MARKER AND PROCESS OF MAKING IT

Gilbert Rodli, Huntingdon, Pa.

Application September 27, 1939, Serial No. 296,845

10 Claims. (Cl. 41—33)

1

This invention relates to reflecting signs, reflecting indicia, sheet reflecting material capable of being used for decoration, highway marking, signs and the like; and to the process for the manufacture of such material. The invention also relates to a novel process for the fabrication of loaded decalcomanias containing light refracting, decorative, and other media.

Prior to the instant invention, it has been contemplated that decorative objects, motion picture screens, and highway markers be fabricated by arranging very small glass spheres or other small reflecting or decorative material on a surface by the utilization of adhesives, reflecting pigmented binders, mechanical frames and the like. These methods of application and the results produced were not always satisfactory for the applications of these materials were in the main applied on the job to the finished object and hence were not always made under the best conditions. When the applications of these materials were not made on the job, it was necessary to utilize some base such as a metal base in the case of signs or a wooden base in the case of signs and markers, a cloth base in the case of lamp shades and movie screens and other bases. In the first case, the results were not always satisfactory as conditions were not always optimum in the field and in the second case, while the results may have been more satisfactory, yet they were expensive as it was necessary to include some base for holding the reflecting material, which base served no useful purpose in the field.

For example, prior to the instant invention, if it were contemplated to apply the reflecting material to the back of an automobile truck body, it was necessary to apply an adhesive such as a reflecting pigmented binder directly to the truck body in the field and then apply the small glass spheres to the reflecting binder while the same was in a wet or semi-wet condition. The work being in a vertical position, it was relatively difficult to satisfactorily apply the glass spheres as compared with a job in which the work is held in a horizontal position. When the same job was to be done in the factory instead of in the field, the reflecting indicia or sign or sheet material must be mounted upon a base which later must be mounted upon the back of a truck in the field and this procedure necessitated the use of extra material such as a base which serves no purpose after the application has been made in the field.

In some instances it is essential that the completed work be as light in weight as possible and accordingly if the object to be decorated or upon which the sign is to be made cannot be worked on in the field, a base will have to be made which base must be applied to the object increasing its total weight by the weight of the base or the object will have to be decorated in the field with

2 accompanying unsatisfactory results because of conditions existing in the field which are relatively poor as compared with conditions in the factory.

It is an object of the instant invention to provide a sheet material consisting of a reflecting binder loaded with refracting or decorative media which can be handled without a base for the binder or with a relatively inexpensive or lightweight base, which sheet material is capable of ready application to a base in the field.

It is a further object of the instant invention to provide a novel process for making transferable loaded sheet material.

It is another object of the invention to provide a novel process for loading transferable indicia and insignia with refracting material.

Other objects and the nature and advantages of the invention will be apparent from the following description taken in conjunction with the accompanying drawings, wherein:

Fig. 1 is a schematic illustration of an apparatus for carrying out a process in accordance with the invention;

Figure 1a is a schematic view of a part of the apparatus illustrated in Fig. 1 with additions to modify the same;

Fig. 2 is a schematic illustration of a sheet material with parts cut away to depict various laminae;

Fig. 2a is an enlarged fragmentary sectional view of the material illustrated in Fig. 2;

Fig. 3 is a top plan view of a sheet of porous grain paper;

Fig. 4 is a view similar to Fig. 3 but illustrating the same after the application of a water soluble adhesive;

Fig. 5 is a plan view of the sheet in Fig. 4 after a ground coat of enamel has been applied thereto;

Fig. 6 is a view of the laminated sheet of Fig. 5 after an additional coat of enamel has been applied;

Fig. 7 is a view of the material of Fig. 6 after a silk screen having indicia cut out therefrom has been applied thereover;

Fig. 8 is a view of the laminae of Fig. 7 after a binder coat has been applied through the cut out portions of the silk screen;

Fig. 9 is a view of the laminae of Fig. 8 after small glass spheres have been incorporated in the binder coat;

Fig. 10 is a view of the material in Fig. 9 after soaking and with the enamel and insignia thereon partially removed from the paper back;

Fig. 11 is a view of the back side of the removed enamel and insignia of Fig. 10 after a coating of adhesive has been applied to the said back side;

Fig. 12 is a view similar to Fig. 11 after a sheet of wax paper has been applied over the adhesive; and Fig. 7a is a view similar to Fig. 7 but of a modified form of silk screen which may be used in the process when it is desired that the indicia or insignia be unloaded and the space thereabout be loaded, such as for example with small glass spheres.

Referring to Fig. 1, a roll of porous paper 20 is unrolled in the direction of the arrow and passed through rollers 21 and 22 which rotate in the direction illustrated. A water soluble adhesive is metered from the container 23 to the roller 22 which applies the said water soluble adhesive to the upper surface of the porous paper which then passes through the drier 24 which may take any suitable form. For example, it may be an air drier or a baking oven or any other drier known in the art. After passing through the drier 24, the sheet paper coated with water soluble adhesive is passed through the rollers 25 and 26 which rotate in the direction of the arrows. A ground or base coat of enamel is applied to the laminated sheet at this stage of the process by the roller 26 which receives the enamel on its exterior surface from the reservoir 27. The enameled laminated sheet is then passed through the drier 28 to between the rollers 29 and 30 which rotate in the direction shown. The reservoir 31 dispenses a second coat of enamel to the roller 30 which meters the same on to the surface of the laminated sheet which is then passed through the drier 32. The laminated sheet then receives a binder coat, which may be reflecting, from the roller 33 which together with the roller 34 act to pass the laminated sheet therebetween. The binder material is dispensed to the roller 33 from the reservoir 35.

The laminated sheet having its top wet laminae of binder material is then coated with glass spheres dispensed from the container 36. The loaded laminated sheet is then passed through the final drier 37. At it is sometimes desirable to merchandise the laminated sheet on a paper base, the process may be complete at this point. When the material thus completed is used in the field, the paper may or may not be removed. When it is desired that the paper be removed, the laminated sheet is soaked in water, causing the water soluble adhesive to release its bond between the paper and the enamel and the lamina sans the paper sheet may then be applied while wet to a base in the field, when conditions are such as to make this procedure desirable.

In some instances, however, it is desirable to remove the porous paper in the factory and accordingly the laminated sheet after it leaves the drier 37 is then passed over a roller 38 to the water bath 39 under the rollers 40 and 41 which are submerged in the water bath and then upwardly over the roller 42 above the water bath. After the laminated sheet has passed through the bath 39 the loosened porous paper is then threaded on to the roller 43 and is wound up into a roll 44 which may then be used over again in the place of roll 20. The remainder of the laminated sheet is then passed between the rollers 45 and 46 to effect continuance of movement. Between the roller 42 and the rollers 45 and 46, a spray 47 may be arranged beneath the laminated sheet to spray thereon a coating which becomes adhesive upon being activated. Inexpensive wax paper may be unrolled from roll 48 and passed between the roll 45 and the underside of the coated laminated sheet passing under the roll 46. The finished product 49 may then be wound into roll 50 for subsequent use as desired.

Whereas the bath 39 contains water, it is to be understood that it is within the spirit of the invention to substitute other adhesives for the water soluble adhesive in the container 23 but that the material in the bath 39 must be of a nature which will dissolve such adhesive. It is to be further understood that though two ground coats are dispensed from the reservoirs 30 and 31, one of the said coats may be omitted or more than two coats may be applied. It is also to be understood that the binder from the container 35 may be reflecting or non-reflecting depending upon the use to which the finished material is to be put. The container 36 is adapted to dispense small transparent glass spheres, other reflecting or refracting particles, or other decorative particle media. The adhesive from the spray 47 may be of the character which is adapted to be activated by "petro benzol," gasoline, water or the like or the adhesive may be in a condition of tackiness such as not to require an activator. When the finished product is to be used, the inexpensive wax paper is stripped therefrom, the adhesive activated if necessary and the laminated sheet applied to a surface in the field as required. When the application is made, care should be taken that the edges of the finished product are carefully sealed so as to preclude the formation of air pockets.

When it is desired that the finished product be formed on its top surface with the loading media arranged in the form of indicia or patterns an endless flexible stencil 51, see Fig. 1a, is rotated by the rollers 52, 53, 54 and 55 in the direction shown, whereby the stencil will pass between the rollers 33 and 34, receive its application of binder material and then beneath the container 36 to receive its application of loading media. The remainder of the apparatus and the process is similar to that shown in and described in connection with Fig. 1.

Referring to Figs. 2 and 2a which illustrate the finished sheet material and its laminae after it leaves the drier 37, the porous paper 56 forms the removable base, the lamina 57 is the soluble adhesive, the lamina 58 is the first enamel ground coat, the lamina 59 is the second ground coat, the lamina 60 is the loading media binding coat and the lamina 61 is the loading media which may comprise small glass spheres. When glass spheres are utilized, it is preferred that they range in size from 0.005 to 0.040 of an inch. They may all be uniform in size or blended of grades within this range. The enamel laminae, when such glass spheres are utilized, may range from 0.001 to 0.008 inch in thickness and the binder which may be a reflecting opaque binder may have a wet film thickness of from 0.005 to 0.020 inch when the glass spheres of the sizes mentioned are used.

It is of course to be understood that it is within the scope of the invention to eliminate both of the enamel coats and utilize a reflecting opaque binder of sufficient film thickness and strength as to be capable of supporting a total coverage of glass spheres without the aid of any primary lamina. It will of course be appreciated that this is not always the preferred procedure as the binder material is exposed to the surface and may have to have some characteristics which make it necessary to utilize an expensive material. Hence, it is only necessary to utilize enough binder material as to be capable of satisfactory holding the loading media with the desired relationship therewith. It is necessary, however, if the finished sheet material is to be loaded, that the base be of a sufficient thickness and strength to hold together and hence a strong inexpensive base such as the enamel coats or laminae may be utilized. When the glass spheres are the loading media, it is preferred that from eighty to one hundred per cent of the sheet material that is to be covered be loaded and accordingly, the base, exclusive of the porous paper, must be related in strength and thickness to the load to hold the same together after it is removed from the porous paper and ready for use in the field or otherwise.

Not only may the material in accordance with the invention be made in the form of a continuous sheet, but it is desirable in some instances, where the finished material is to have a specific purpose such as for example when it is a design for a plaque, or a sign, or a marker of a predetermined size, to use a silk screen process to manufacture the finished sign, insignia or the like with portions of the area of the finished material, which may be of a predetermined size, loaded with light refracting, reflecting or decorative media and other portions of its area unloaded. The method of loading portions of the area of the finished material will be described in connection with Figs. 3 to 12 inclusive, but this same process may be used in connection with the apparatus shown in Fig. 1a.

Referring to Figs. 3 to 12 inclusive, a porous paper sheet 100 is coated with a water soluble adhesive 101, see Fig. 4, which in turn is then coated with an enamel ground coat 102, see Fig. 5. Fig. 6 discloses a second ground coat 103 applied over the first ground coat 102 prior to the laying of a silk screen 104 which is cut out to make a stencil for the letters G and O, over the laminated sheet thus formed. It is to be understood that between the application of the successive coats or laminae, a drying step takes place. Through the cut out portions in the silk screen illustrated in Figs. 7 and 8, a binder coat 105, which may be reflecting in character, is applied over the silk screen, and through the cut out portions to the laminae 103, see Fig. 8. While the binder coat is still wet or is in a semi-wet condition, a loading media 106, such as small glass spheres, reflecting particles, light refracting particles or other decorative media is applied over the silk screen and through the openings therein on to the binder 105, see Fig. 9. The laminated sheet is then soaked in water to cause the water soluble adhesive to soften and release its bond between the paper backing 100 and the ground enamel coat 102 whereby the bottom lamina of paper may be removed from the remainder of the laminae. Prior to the removal of the paper backing 100, the binder 105 for the spheres or other loading media 106 may be air dried or baked to effect a good bond between the loading media and the binder.

When the paper backing 100 is removed, as by soaking in water, the remainder of the laminae may then be applied in the field to a surface to bear the insignia, indicia, sign or other decorative emblem. When the glass beads are the loading media, the loaded laminae will be auto-collimating in effect as the beads are only embedded in the reflecting binder coat to a sufficient depth to coact therewith to effect refraction and reflection in an auto-collimating manner. It may be sometimes desirable to merchandise the laminated sheet without the paper backing and accordingly, as in Fig. 11, after the paper backing has been removed, an adhesive 107 is applied to the reverse side of the enamel lamina of the loaded laminated sheet, which adhesive is adapted to be activated by "petro benzol" or the like and when other adhesives are utilized other corresponding or related activators may be used in association therewith. The adhesive may be dried and then wax paper 108 applied to the back thereof as shown in Fig. 12. When the loaded marked laminated sheet is ready to be applied in the field, the wax paper 108 may be stripped from the back thereof, the adhesive activated, and the loaded marked laminated sheet applied as desired without the utilization of any base whatsoever to hold the load of the auto-collimating, decorative or other media, other than the binder coat and the enamel or simply the binder coat when sufficient of that material is utilized and related in thickness and strength to the loading media so that the entire sheet will be held together even though no other base is incorporated on its back. This process is quite different from the ordinary decalcomania process which involves soaking to remove the base and the immediate application of the decalcomania in the field for otherwise the decalcomania would tear or otherwise be destroyed because of its delicacy and other characteristics.

Not only may the insignia be loaded, but it is contemplated in accordance with the invention that the remainder of the sheet outside the area of the insignia, indicia or decorated area be loaded by the utilization of a silk screen 104', such as shown in Fig. 7a. The process involving the utilization of the silk screen 104' is similar to that described in connection with Figs. 8 to 12 inclusive. The stencil 51 in Fig. 1a may take the form of the stencil 104 shown in Fig. 7 or the stencil 104' shown in Fig. 7a, when it is desired that the process be continuous.

It is to be understood that in accordance with the invention, the finished article ready for application in the field, which finished article has been made in the factory or in a convenient location with the necessary equipment to effect economical production, comprises a sheet of binding material which may be paint and a loading media over at least a portion of the area thereof and may comprise nothing else or additional coats of paint such as enamel to back up the binder.

The utilization of reflecting binders bearing auto-collimating material such as glass beads has been accepted by highway authorities for use in the fabrication of lane lines on automobile roads and for the marking of runways for airports and the like. These lane lines and markings have been fabricated in the field by the application of a paint-like reflecting binder to the surface to be marked and the dispensing thereover while the binder is in a moist or semi-moist condition of small glass spheres. This job in the field involves careful work by experienced men, the use of expensive equipment in the field which may be easily damaged, and the necessity for protection of the line after it is laid down for any traffic thereover would render the work unusable. In accordance with the invention, however, the entire lane line or marker may be fabricated in a factory and comprise solely a binder and glass spheres or the like without any paper backing or other backing. This material may be rolled, transported to the field and then unrolled over an application of tar or other adhesive and subsequently rolled to insure sealing of the edges and prevent the formation of air pockets. The finished marker will be capable of immediate and effective use, will be more efficient because of the better control provided in the factory especially with regard to the dispensing of the beads or glass spheres over the binder, there will be less waste of materials because of the better control in the factory, the finished job will be more satisfactory to the user not only insofar as efficiency is concerned but because of the immediate availability of the line or marker without danger of its being rendered void because of lack of protection as would otherwise be necessary. The expense, insofar as time and materials is concerned, otherwise necessary for the arranging of the necessary protection subsequent to the laying of a fresh line in the field is completely avoided. Because of the fact that the line is brought to the field in rolls, containers for glass spheres and containers for the binder are unnecessary and are avoided. The finished marker will have effective margins without the use of any special and expensive equipment as is otherwise necessary to effect clean margins. The use of the binder necessary in connection with the laying of a prefabricated line, as described, does not materially add to the expense of the finished marker, as the adhesive may be of the cheapest type, for example, it may be tar, such as is ordinarily applied to a road surface. It is also contemplated that such prefabricated line or marker be applied to a newly constructed road or airport runway wherein the top surface involves tar or the like such as is capable of holding the prefabricated marker in position after the same is rolled thereover.

It will be obvious to those skilled in the art that various changes may be made in this device without departing from the spirit of the invention and therefore the invention is not limited to what is shown in the drawings and described in the specification but only as indicated in the appended claims.

What is claimed is:

1. The process of fabricating a sign comprising unrolling a sheet of paper, applying a water soluble adhesive thereto, drying the said adhesive, applying to the now laminated sheet a coat of enamel, drying said coat of enamel, applying to the laminated sheet a second coat of enamel, drying said second coat of enamel, passing a stencil over said laminated sheet, applying a reflecting binder through said stencil on to said laminated sheet, applying a loading media through said stencil on to said binder while the same is in a moist or semi-moist condition, drying the binder, soaking the laminated sheet in water to loosen the bond of the soluble adhesive between the paper and the first coat of enamel, and removing the paper from the loaded binder on the enamel base to effect a sign.

2. The process of making an auto-collimating sign including the steps set forth in claim 1, the loading media being small glass spheres, the application of the spheres to the binder involving but a partial embedding thereof whereby at least a portion of the surface of the spheres is exposed.

3. The process recited in claim 1, rolling the removed paper backing, passing the remainder of the laminated sheet to a roller, and applying an adhesive to the bottom side of said laminated sheet prior to said roller.

4. The process recited in claim 1, rolling the removed paper backing, passing the remainder of the laminated sheet to a roller, and applying an adhesive to the bottom side of said laminated sheet prior to said roller, permitting said adhesive to dry, and reactivating said adhesive in the field.

5. A lane line decalcomania consisting of a lamina of porous paper, a second lamina of a water soluble adhesive, a third lamina of enamel, a fourth lamina of enamel, a fifth lamina of a reflecting binder, and a loaded surface of glass spheres.

6. A surface marker decalcomania comprising a porous paper lamina, a water soluble adhesive lamina, an enamel lamina, a reflecting binder lamina loaded with small glass spheres.

7. A surface marker decalcomania comprising a paper backing, a soluble adhesive, an enamel lamina of from 0.001 to 0.008 of an inch thick, a reflecting pigmented binder coat of from 0.005 to 0.020 of an inch wet film thickness, said binder being loaded with glass spheres ranging in size between 0.005 to 0.040 of an inch.

8. The process of fabricating a sign comprising applying a water soluble adhesive coating to a sheet of porous paper, applying at least one enamel coat over said adhesive after the adhesive has been dried, drying the enamel coat, laying a stenciled silk screen over the enamel coat, applying a reflecting pigmented binder over said silk screen stencil, and while the binder is in a moist or semimoist condition loading the same with a plurality of small glass spheres, drying said binder, dissolving the adhesive between the paper and the enamel and removing said paper from the enamel, applying a fresh adhesive capable of being dried and later reactivated to the back of the enamel, drying the said fresh adhesive, whereby the dried adhesive may later be reactivated or freshened in the field and the thus formed laminated sheet applied to a surface or backing in the field.

9. The process recited in claim 8, the silk screen stencil having cut out portions corresponding to the sign, and loading the binder which corresponds to the sign.

10. The process recited in claim 8, the silk screen having cut out portions corresponding to the negative of the sign, and loading the binder to effect a negative of the sign.

GILBERT RODLI.

REFERENCES CITED

The following references are of record in the file of this patent:

UNITED STATES PATENTS

| Number | Name | Date |
| --- | --- | --- |
| 493,449 | Schmalz | Mar. 14, 1893 |
| 823,445 | Schramm | June 12, 1906 |
| 912,171 | Rock | Feb. 9, 1909 |
| 1,576,562 | Voss | Mar. 16, 1928 |
| 1,626,508 | Carlson | Apr. 26, 1927 |
| 1,721,192 | Tarbox | July 16, 1929 |
| 1,725,199 | Kuhn | Aug. 20, 1929 |
| 1,879,799 | Glaesel | Sept. 27, 1932 |
| 1,998,053 | McBurney | Apr. 16, 1935 |
| 2,007,404 | McLaurin | July 9, 1935 |
| 2,043,414 | Korff | June 9, 1936 |
| 2,143,946 | Hunter | Jan. 17, 1939 |
| 2,218,909 | Gill | Oct. 22, 1940 |
| 2,403,752 | Phillipe | July 9, 1946 |